Aug. 20, 1957   H. I. OSHRY   2,803,553
BARIUM TITANATE CERAMIC DIELECTRICS
Filed July 3, 1953   2 Sheets-Sheet 1

INVENTOR
Howard I Oshry
BY Ralph Hammar
ATTORNEY

United States Patent Office 2,803,553
Patented Aug. 20, 1957

2,803,553

BARIUM TITANATE CERAMIC DIELECTRICS

Howard I. Oshry, Erie, Pa., assignor to Erie Resistor Corporation, Erie, Pa., a corporation of Pennsylvania Application July 3, 1953, Serial No. 365,935

6 Claims. (Cl. 106—39)

This application is an improvement on applications Serial Nos. 213,090 (now abandoned), 224,389 (now Patent 2,695,239), and 330,584 (now Patent 2,695,240).

This invention is intended to produce a high dielectric constant barium titanate ceramic dielectric having markedly reduced aging (e. g. 1% per decade as compared to 3–10% per decade). In a preferred form the dielectric also has a low temperature coefficient of dielectric constant, a negligible piezo-electric effect when polarized, and a negligible voltage coefficient of capacity. All of these properties are highly desirable in ceramic capacitors. These results are obtained starting with commercial as distinguished from chemically pure raw materials.

The reduced aging is produced by adding minute amounts (less than 4% by weight) of calcium and iron to commercial barium titanate which has a tetragonal crystal structure below the Curie point, as determined by X-ray diffraction.

The reduced aging and the low temperature coefficient, the negligible piezo-electric effect and the negligible voltage coefficient are obtained by making the minute calcium and iron additions to a barium titanate which appears by X-ray diffraction to have a crystal structure which is cubic at room temperature. This is the preferred form.

In both forms, the mixture is fired to produce a dense ceramic.

The combination of iron and calcium has the unique property of reducing the aging. In the preferred form, the combination of calcium and iron is better than either alone for lowering the piezo-electric effect, and the temperature and voltage coefficients. The combination of iron and calcium also markedly reduces the dielectric power losses as compared to the losses obtained by the use of either alone.

The additions producing the improved characteristics are in such small amounts that the high dielectric constant (1,000+) of the barium titanate is not diluted.

Figure 1:
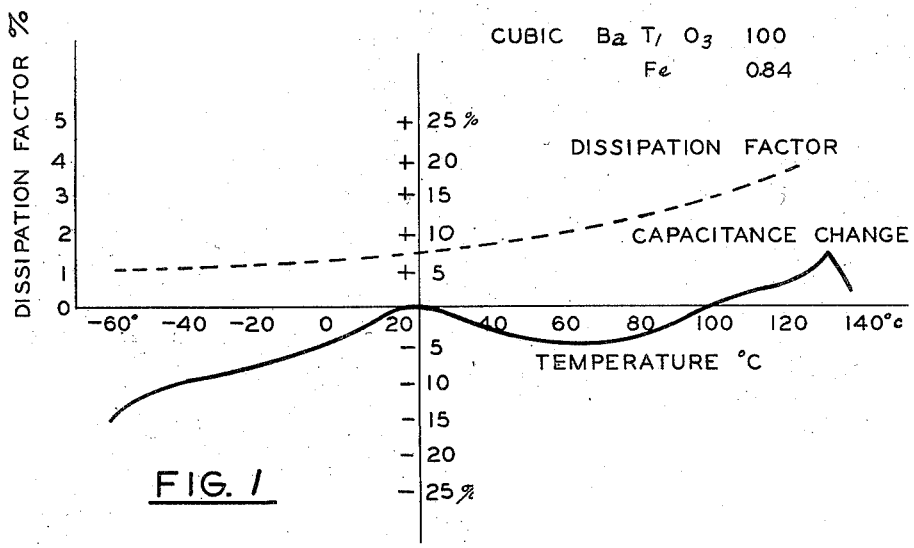
Figure 2:
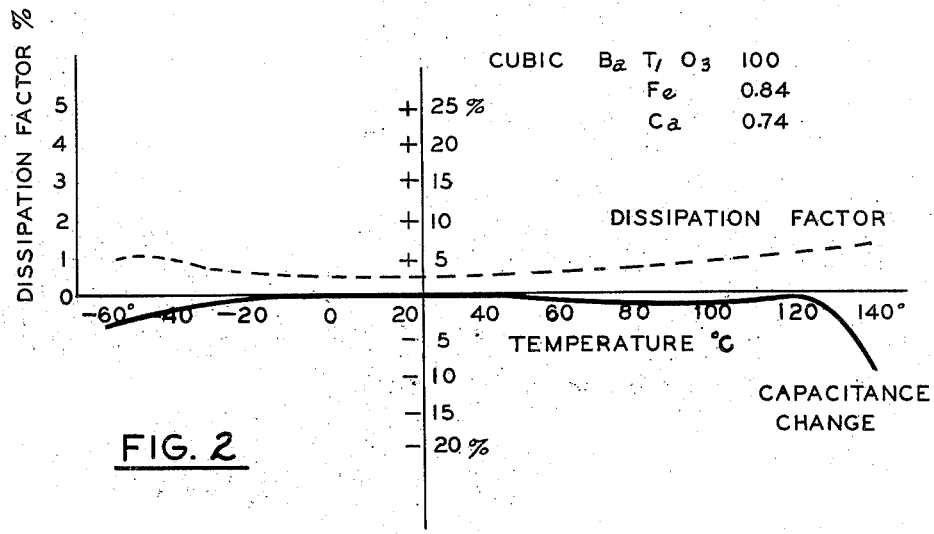
Figure 3:
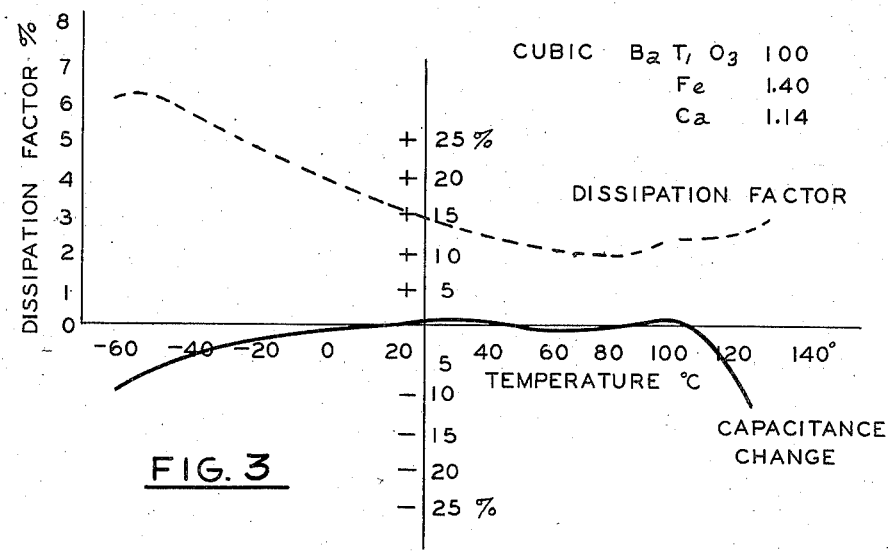
Figure 4:
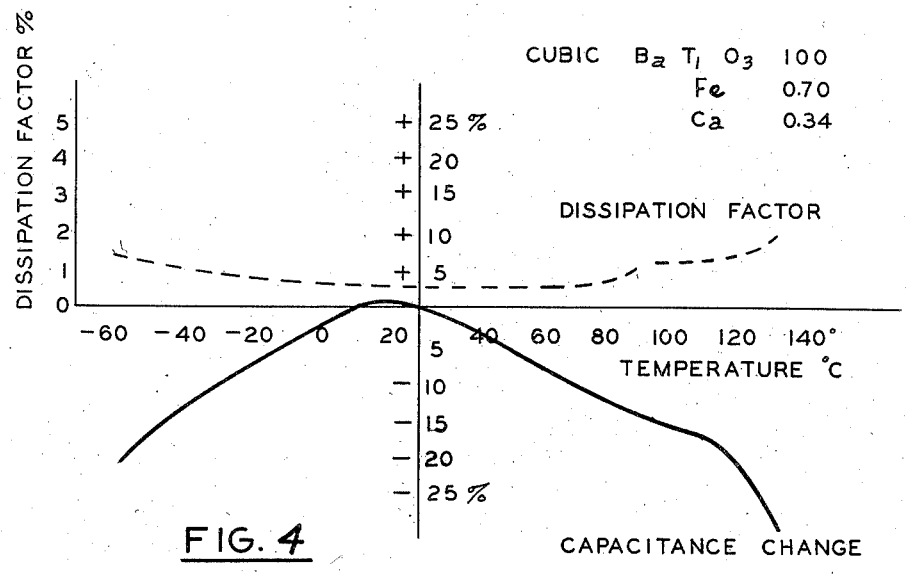

In the accompanying drawing, Fig. 1 is a diagram showing the change in capacity and power losses throughout the temperatures range —60° C. to +140° C. of a ceramic consisting essentially of 100 parts cubic barium titanate and .84 parts iron; Fig. 2 is a similar diagram for a ceramic consisting essentially of 100 parts cubic barium titanate, .84 parts iron and .74 parts calcium; Fig. 3 is a similar diagram for a ceramic consisting essentially of 100 parts cubic barium titanate, 1.40 parts iron and 1.14 parts calcium; and Fig. 4 is a similar diagram for a ceramic consisting esesntially of 100 parts cubic barium titanate, .70 parts iron and .34 parts calcium, all parts being by weight.

In the preferred form, the starting point is barium titanate in which the randomly oriented crystallites appear cubic by X-ray diffraction. This varies from the usual barium titanate where the crystallites appear tetragonal below the Curie point by X-ray diffraction. One way of preparing the barium titanate which has crystallites which appear cubic by X-ray diffraction at room temperature is from precipitated barium titanium oxalate obtained by the reaction of barium chloride, titanium tetrachloride, and oxalic acid. The starting materials need not be chemically pure, but the ordinary commercial materials which may contain up to 3% of impurities are satisfactory. The barium titanium oxalate is washed free of chlorides with ordinary tap water and after washing the precipitated barium titanium oxalate is filtered and then calcined to drive off the oxalic acid radical and convert the salt to barium titanate. For best results, the particle size range of the barium titanium oxalate should be in the region which is accomplished by holding the precipitated barium titanium oxalate in contact with the solution from which it was precipitated for approximately 16 hours. The hold-time for the precipitated barium titanium oxalate probably results in the growth of barium titanium oxalate crystals to an optimum size.

The calcining temperature at which the oxalic acid radical is driven off the barium titanium oxalate is not critical. Calcining temperatures in the range of 600° C.–1000° C. have been used, the higher temperatures requiring shorter times with the risk that there will be localized over-heating resulting in some barium titanate in which the crystallites appear tetragonal below the Curie point. The resultant barium titanate produced after the low-temperature calcining of the barium titanium oxalate is of much higher purity than the starting ingredients. Apparently, as a result of the precipitation of the barium titanium oxalate, most of the impurities remain in solution and are washed away. The high purity of the low-temperature calcined barium titanate may account for the crystal structure in which the crystallites appear cubic at room temperature by X-ray diffraction. The absence of impurities eliminates the presence of foreign centers which might act as nuclei for crystal growth. The low-temperature calcined barium titanate may have the usual commercial variation in the stoichiometric ratio of barium oxide and titanium dioxide. The important factor apparently is that the crystal structure is such that the barium titanate crystallites appear cubic below the Curie point.

Upon adding to the calcined barium titanate powder small amounts of iron and calcium, the mixture is then conditioned for making a dense ceramic by the usual techniques. While either calcium or iron alone inhibit the growth of crystallites during the firing of the ceramic at the firing temperature, e. g. 1350° C., the effect of iron and calcium together is much better than either alone. The calcium appears to be effective in preventing the drop in dielectric constant at the low-temperature end of the curve, while the iron is primarily effective in preventing the increase in dielectric constant at the high-temperature end of the curve. The iron and calcium appear to act substantially independently of each other, or perhaps it could be more accurately said that a barium titanate composition having iron additions which has a nearly flat dielectric constant at the high-temperature end and a drooping dielectric constant at the low-temperature end will have the drop at the low-temperature end decreased by calcium additions which will leave the high-temperature end of the characteristic curve substantially unchanged. Another effect of the iron and calcium additions is the lowering of the dissipation factor or dielectric losses. Where a barium titanate ceramic with iron additions alone might have a maximum dissipation factor of 5%, the adding of calcium in addition to the iron will reduce the dissipation factor to a maximum of the order of 2%. A still further improvement of the iron and calcium additions is in the aging characteristics. With iron and calcium additions, the logarithmic aging is 1% per decade so that at the end of a thousand days, the drop in dielectric constant from that on the first day would be of the order of 3%. This contrasts with from 9% to 30% in other barium titanate ceramics. The addition of the calcium and iron further makes the piezoelectric effect and the voltage coefficient negligible. The result is a ceramic dielectric which has characteristics more closely approaching the stability of mica than were heretofore obtainable in the high dielectric constant ceramics. The calcium and iron additions do not depress the dielectric constant appreciably because the additions are of such small value that the dielectric constant of the resultant ceramic is not diluted.

The manner in which the calcium and iron additions are made to the cubic calcined barium titanate powder is not critical. The iron can be added in the form of powdered metallic iron, but it is usually easier to add it in the form of iron oxide. Iron oxide is readily obtainable and is cheap. The calcium additions likewise are not critical. Calcium oxide, calcium carbonate, and calcium fluoride are readily available and cheap calcium bearing materials which can be added to the cubic calcined barium titanate. The iron and calcium additions must be made to the calcined barium titanate powder, while the powder is still in a cubic state. During the subsequent firing of the ceramic, the iron and calcium compounds break down and iron and calcium ions enter into the crystal lattice in such a way as to inhibit the change from cubic to tetragonal, which normally takes place in commercial barium titanate.

Fig. 1 shows the characteristics of a barium titanate ceramic dielectric obtained by adding .84 part of iron to 100 parts of cubic barium titanate, all parts by weight. Over the range —50° C. to +130° C. the dielectric constant varies 17% and the dissipation factor varies from 1% to 4%. This is materially better than commercial barium titanate dielectrics.

By adding to the Fig. 1 dielectric .74 part by weight of calcium before firing, the variation in dielectric constant over the range —50° C. to +130° C. is reduced to less than 5% and the dissipation factor is reduced to .7 to 1.2%. This is far better than the results which would have been obtained by adding the same total weight of either iron or calcium alone. With 1.58 parts by weight of either iron or calcium alone, over the range of —50° C. to +130° C. the dielectric constant would vary 40% and the maximum dissipation factor would be 10%. The combination of iron and calcium is accordingly much more effective than either alone. Over the range 0° C. to +100° C. the variation in dielectric constant is less than 1% and the dissipation factor is less than 1%. This is shown in Figure 2.

Larger additions of iron and calcium increase the dissipation without marked effect on the temperature coefficient of dielectric constant as shown by Fig. 3. With 2.5 parts iron added before firing to 100 parts cubic barium titanate, over the range 0° C. to 100° C. the dielectric constant would vary 60% and the dissipation factor would vary from 8–25%. Apparently iron or calcium alone have a tendency to make the dielectric conductive thereby both increasing the losses and cutting down the flattening effect on the temperature coefficient of the dielectric constant. The combination of iron and calcium permits the use of larger quantities without making the dielectric conductive, and in fact the combination has the effect of decreasing the dielectric losses.

For best results, the iron and calcium should be in substantially equi-mol fractions, e. g. 3 calcium atoms to 2–4 iron atoms with the excess of calcium being preferable. The effect of an excess of iron atoms is shown in Fig. 4 where the ratio of iron to calcium atoms is about 3:2. While the dielectric losses are lower than with either iron or calcium alone, the variation of dielectric constant with temperature is not appreciably better, and in fact is slightly worse at the upper and lower temperature limits than that obtained with either iron or calcium alone. If the proportions of iron and calcium were reversed, the dielectric losses would be about the same and the dielectric constant would have less than half the variation with temperature. If both low losses and low variation of dielectric constant with temperature are desired, the calcium atoms should nearly equal or even exceed the iron atoms while if only low losses are desired, the iron may substantially exceed the calcium.

All of the barium titanate ceramics so far described which start with a cubic crystal structure have a cubic crystal structure below the Curie point after firing as observed by X-ray diffraction. The iron and calcium additions prevent the change from cubic to tetragonal. This eliminates the piezo-electric property obtainable by polarizing the tetragonal barium titanate. It also reduces the voltage coefficient of capacity reducing the change to 1/10 or less than that obtained with the tetragonal barium titanate.

Another effect of the iron-calcium additions which is different from either iron or calcium alone is the decreased aging. Barium titanate dielectrics age logarithmically at from 3–10% per decade, i. e. the dielectric constant drops 3–10% in 10 days, 6–20% in 100 days, 9–30% in 1000 days, etc. With iron and calcium additions, the logarithmic aging rate is reduced to about 1% per decade. The decrease in aging is obtained even if the barium titanate has a crystal structure below the Curie point which is tetragonal as observed by X-ray diffraction.

In other words, low aging can be obtained by iron and calcium additions to commercial barium titanate which has the tetragonal crystal structure. This is surprising since the reduction in the temperature coefficient of dielectric constant and in the voltage coefficient of capacity are not obtained unless the barium titanate has an apparent cubic crystal structure. Many of the commercial barium titanate formulations have additions for improving the characteristics. These commercial formulations can be adjusted to have the property of low aging by having the iron and calcium additions. While the temperature characteristics have substantial variation, the low aging is less critical and is exhibited by formulations where the iron and calcium are each above .3% by weight. For example, the formulations of Figs. 2, 3, and 4 all exhibit low aging and differ much less as to aging than as to change of capacitance with temperature.

Because the effects of the iron and calcium additions are related to the quantities used, there is an element of judgment in selecting the formulation for any particular purpose. The following will serve as a guide for determining the proportions.

The amount of iron and calcium should be kept to less than 4% of the total weight to prevent excessive power losses.

For optimum results, the iron and calcium should be in substantially equal mol fractions (e. g. 3 calcium atoms to 2–4 iron atoms) with an excess of calcium preferred to an excess of iron.

Neither the iron nor the calcium should be less than .3% of the weight of the composition. Below this amount, the effects are not present in sufficient magnitude to offer enough advantage over commercial formulations.

For low aging, any barium titanate (cubic or tetragonal) may be used. Other ingredients may be present. The aging will be improved with the minimum amounts (.3% iron and .3% calcium).

For decreasing the voltage coefficient of capacity, the temperature coefficient of dielectric constant and the piezoelectric effect, the iron and calcium additions should be made to a barium titanate which has a cubic crystal structure below the Curie point as determined by X-ray diffraction. Cubic crystal structure means that the characteristic lines present in the tetragonal form are no longer present but there are only diffuse bands in the places where the tetragonal form has distinct lines.

For low losses, i. e. lower than obtained by additions to the cubic barium titanate of either iron or calcium alone, the iron atoms may exceed the calcium atoms. If the excess of iron over calcium is 3:2 or greater, the variation of dielectric constant with temperature will be greater at high and low temperature than would be the case if the calcium were entirely omitted. However, as the number of calcium atoms approaches and begins to exceed the iron, the variation of dielectric constant with temperature becomes better than either iron or calcium alone.

What is claimed as new is:

1. A high dielectric constant ceramic dielectric consisting essentially of a crystal lattice of barium titanate combined with ions of iron and calcium, the iron and calcium being less than 4% of the barium titanate by weight, and neither the iron nor the calcium being less than .3% of the barium titanate by weight.

2. The dielectric of claim 1 in which the weight of iron and calcium are in substantially equal mol fractions.

3. The dielectric of claim 1 in which the iron is in the range of .3 to 2.2 and the calcium is in the range of .3 to 1.8 parts to 100 parts barium titanate, all parts by weight.

4. A barium titanate ceramic dielectric consisting essentially of a crystal lattice of barium titanate having a cubic crystal structure as determined by X-ray diffraction below the Curie point combined with ions of iron and calcium, the iron and calcium being less than 4% of the barium titanate by weight and neither the iron nor the calcium being less than .3% of the barium titanate by weight.

5. The dielectric of claim 4 in which the weight of iron and calcium are in substantially equal mol fractions.

6. The dielectric of claim 4 in which the iron is in the range of .3 to 2.2 and the calcium is in the range of .3 to 1.8 parts to 100 parts barium titanate, all parts by weight.

References Cited in the file of this patent
UNITED STATES PATENTS

| | | |
|---|---|---|
| 2,695,239 | Oshry | Nov. 23, 1954 |
| 2,695,240 | Oshry | Nov. 23, 1954 |